(12) United States Patent
Mirhakkak et al.

(10) Patent No.: US 9,264,294 B2
(45) Date of Patent: Feb. 16, 2016

(54) HAIPE PEER DISCOVERY USING BGP

(75) Inventors: Mohammad Mirhakkak, Vienna, VA (US); Phong Ta, Vienna, VA (US)

(73) Assignee: The MITRE Corporation, McLean, VA (US)

(*) Notice: Subject to any disclaimer, the term of this patent is extended or adjusted under 35 U.S.C. 154(b) by 1339 days.

(21) Appl. No.: 11/875,107

(22) Filed: Oct. 19, 2007

(65) Prior Publication Data

US 2009/0103729 A1    Apr. 23, 2009

(51) Int. Cl.
*H04K 1/00* (2006.01)
*H04L 29/12* (2006.01)
*H04L 12/701* (2013.01)
*H04L 29/06* (2006.01)

(52) U.S. Cl.
CPC .......... *H04L 29/12367* (2013.01); *H04L 45/00* (2013.01); *H04L 61/2514* (2013.01); *H04L 69/08* (2013.01)

(58) Field of Classification Search
CPC .................... G06F 2221/2111; H04L 63/0428
USPC .......................................... 380/255; 709/242
See application file for complete search history.

(56) References Cited

U.S. PATENT DOCUMENTS

2002/0165957 A1* 11/2002 Devoe et al. .................. 709/224
2007/0076599 A1* 4/2007 Ayyagari et al. .............. 370/229

* cited by examiner

*Primary Examiner* — Anthony Brown
(74) *Attorney, Agent, or Firm* — Sterne, Kessler, Goldstein & Fox P.L.L.C.

(57) ABSTRACT

A system, method, and computer program product are provided for performing peer discovery of HAIPE devices. A local enclave network fronted by a HAIPE device is addressed from the perspective of a "black" network using a "black" address associated with the HAIPE device. In order to properly address a network device within the local enclave, the "black" address associated with the fronting HAIPE device is determined. This is facilitated by mapping the address of the network device to the address of the HAIPE device, and propagating this mapping using the BGP routing protocol.

21 Claims, 8 Drawing Sheets

HAIPE PEER DISCOVERY USING BGP

STATEMENT UNDER MPEP 310

The U.S. Government has a paid-up license in this invention and the right in limited circumstances to require the patent owner to license others on reasonable terms as provided for by the terms of Project No. 0706KAH0-DA, awarded by the Defense Information Systems Agency ("DISA").

BACKGROUND OF INVENTION

1. Field of the Invention

The present invention relates generally to networks and, more particularly, to the operation of end-to-end secure networks.

2. Description of the Background Art

The High Assurance Internet Protocol Encryption ("HAIPE") is the primary encryption device used to provide end-to-end security for the Global Information Grid ("GIG") environment. A HAIPE device operates at the IP layer of the TCP/IP protocol stack and represents a boundary between a common encrypted IP "black core" (e.g., the general Internet) and protected "red enclaves" at the perimeter.

This HAIPE device breaks the normal routing function such that traffic generated in one red enclave cannot be directly routed to other red enclaves. To support end-to-end traffic forwarding, a HAIPE device must be able to discover the "cipher-text" ("CT") address of the HAIPE fronting the destination red enclave, this CT address corresponding to the address of the fronting HAIPE as seen from the black network. Once the CT address is known, the source HAIPE can establish a secure communication channel with the destination HAIPE, and end-to-end secure traffic between a source red enclave and a destination red enclave may be transmitted.

An approach for providing HAIPE peer discovery is the "Routing Based Peer HAIPE Discovery" ("RBD"), which uses Border Gateway Protocol ("BGP") to send PT-to-CT mapping information to other enclaves. The fronting HAIPE of the source red enclave is operable to discover the "plain-text" ("PT") addresses of networked systems within the red enclave using an intra-enclave routing protocol, this PT address corresponding to the address of any systems as seen from within the red enclave. The fronting HAIPE is also able to obtain its own CT address and to create PT-to-CT address mappings using the aforementioned information, which is then provided to a discovery server. The discovery server is itself protected by a HAIPE, but does not necessarily reside in the source red enclave. The discovery server is operable to exchange and further populate the PT-to-CT mapping information with other discovery servers using BGP. Accordingly, when a first workstation located in a first enclave wants to establish communications with a second workstation in a second enclave, the first workstation knowing the PT address of the second workstation, the first workstation could use this mapping to determine the CT address corresponding to the fronting HAIPE which must be contacted in order to establish the communications channel.

By its nature, peer discovery of IP crypto is uni-directional. When a first workstation located in a first enclave wants to establish communications with a second workstation in a second enclave, the first workstation expects the second workstation to provide a reply. For the second workstation to reply, its fronting HAIPE must discover the fronting HAIPE of the first enclave. The peer discovery process at the fronting HAIPE of the second enclave adds latency to communication between the first and second workstation. We name this problem the "double discovery issue."

Accordingly, what is desired is a means of providing optimization of HAIPE peer discovery on reply communications.

SUMMARY OF INVENTION

The invention includes a method for performing peer discovery of HAIPE devices. The method includes the steps of obtaining an address for a network device in a local enclave, determining an address for a HAIPE device fronting the local enclave, mapping the address for the network device to the address for the HAIPE device, converting the mapping to a BGP routing format, and propagating the BGP routing.

The invention additionally includes a computer program product comprising a computer usable medium having computer program logic recorded thereon for enabling a processor to perform peer discovery of HAIPE devices. The computer program logic includes obtaining means for enabling a processor to obtain an address for a network device in a local enclave, determining means for enabling a processor to determine an address for a HAIPE device fronting the local enclave, mapping means for enabling a processor to map the address for the network device to the address for the HAIPE device, converting means for enabling a processor to convert the mapping to a BGP routing format, and propagating means for enabling a processor to propagate the BGP routing.

The invention further includes a system capable of performing peer discovery of HAIPE devices. The system includes a first module to obtain an address for a network device in a local enclave, a second module to determine an address for a HAIPE device fronting the local enclave, a third module to map the address for the network device to the address for the HAIPE device, a fourth module to convert the mapping to a BGP routing format, and a fifth module to propagate the BGP routing.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

Figure 1:
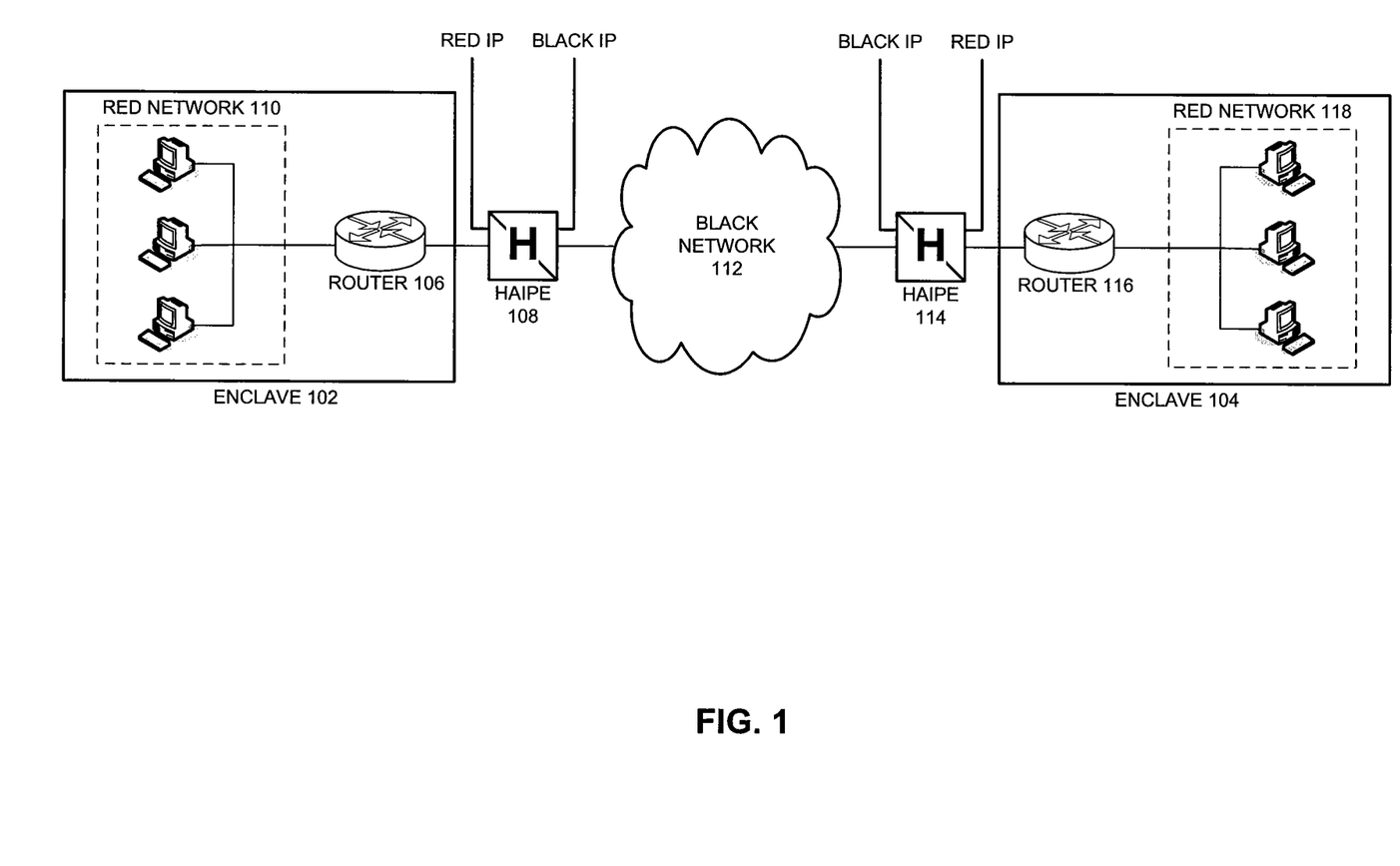
FIG. 1 illustrates a secure communications network, in accordance with an embodiment of the present invention.

FIG. 1 depicts a secure communications network 100, in accordance with an embodiment of the present invention. Secure network 100 includes two red enclaves 102 and 104. Each red enclave comprises a red network 110 and 118, the red networks having one or more networked devices, such as a networked workstation. Also in each enclave is a router 106 and 116 which is operable to establish communications between networked devices, in accordance with an embodiment of the present invention. Each enclave 102 and 104 is fronted by a HAIPE device 108 and 114, with a black network 112 located between them. In accordance with an embodiment of the present invention, black network 112 is an unsecured public network, such as the Internet.

Local discovery services for network 100 are programmed at routers 106 or 116, located in each enclave 102 and 104. Network 100 will be used to illustrate the basic operation of HAIPE communications between networked devices in red network 110 and networked devices in red network 118. One skilled in the relevant arts will appreciate that similar interactions can be achieved with a network having a different topology, and network 100 is shown by way of example, not limitation.

In accordance with an embodiment of the present invention, enclave 102 is isolated from black network 112 by HAIPE 108. HAIPE 108 provides the interface for any communications to or from enclave 102 which are sent over black network 112. HAIPE 108 has a "black IP" (or a CT address) corresponding to its address in black network 112. HAIPE 108 also has a "red IP" (or a PT address) corresponding to its address within enclave 102. HAIPE 114 is similarly configured.

In order to provide end-to-end secured communications between two networked devices, a source network device contacts its fronting HAIPE to request that communications be established with the HAIPE fronting a destination network device, in accordance with an embodiment of the present invention. The HAIPE fronting the destination network device establishes communications to the destination device itself, and end-to-end communications between the source and destination network devices may commence.

In network 100, a network device in red network 110 is able to establish communications with a network device in red network 118 by requesting that HAIPE 108 establish a secure communications channel with HAIPE 114, which fronts the destination red network 118, in accordance with an embodiment of the present invention. The source network device in red network 110 must know the destination address it needs to establish communications with (e.g., the PT address of the destination network device in red network 118), but does not necessarily know how to route data packets through HAIPE 114. In accordance with an embodiment of the present invention, the source network device in red network 110 contacts router 106 to determine a route for packets meant for the destination network device in red network 118.

Assuming router 106 has been provided with information regarding a route to the destination network device in red network 118, then router 106 knows of the association between the CT address of HAIPE 114 and the PT address of the destination network device in red network 118. In accordance with an embodiment of the present invention, router 106 passes this PT-to-CT address mapping to HAIPE 108, which then establishes a secure communications channel over black network 112 to HAIPE 114, enabling the source network device in red network 110 to communicate with the destination network device in red network 118. In this manner, a traditional HAIPE secure communication channel is established.

II. Enhanced Peer Discovery

Figure 2:
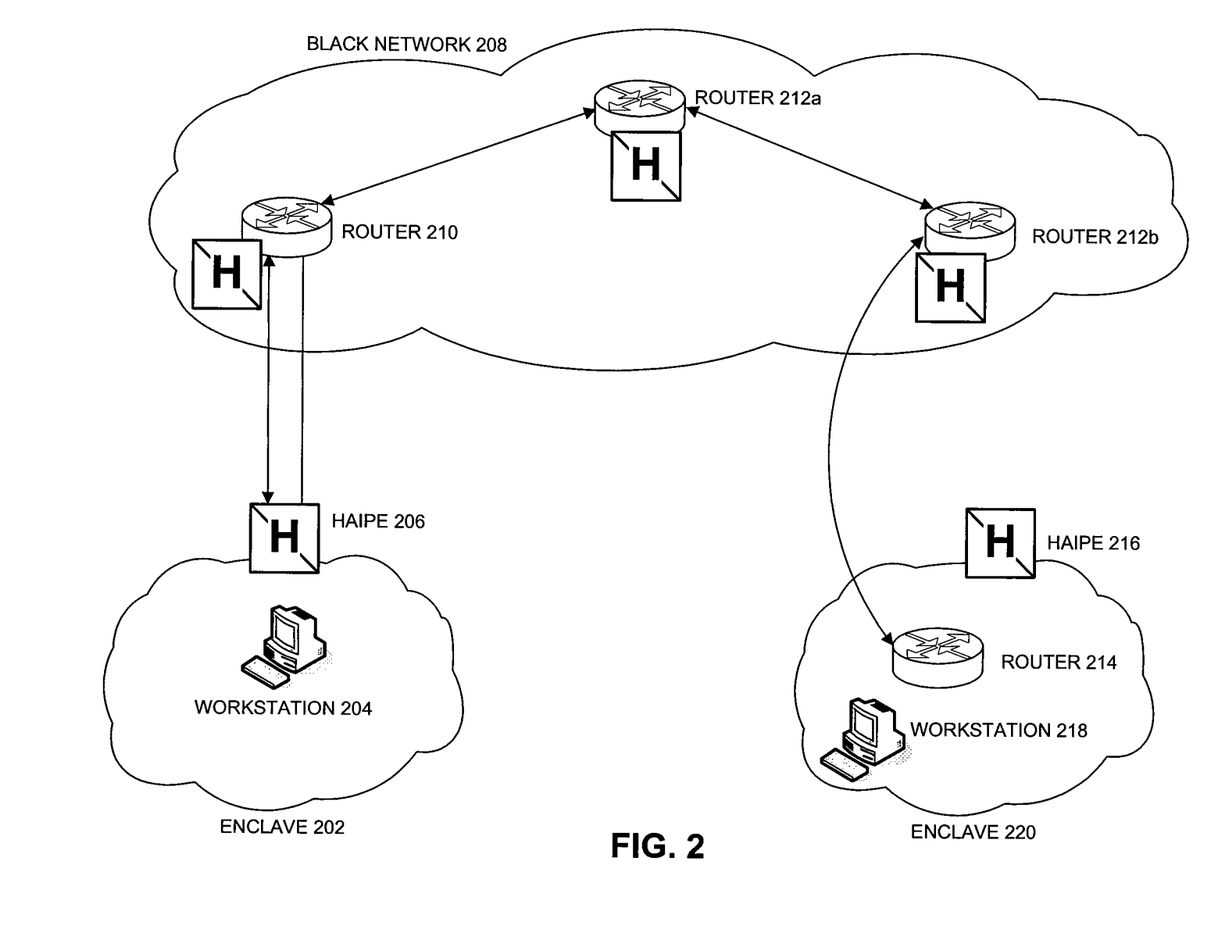
FIG. 2 illustrates a secure communications network implementing enhanced discovery, in accordance with an embodiment of the present invention.

FIG. 2 depicts a secure communications network 200 utilizing an enhanced HAIPE peer discovery approach, in accordance with an embodiment of the present invention. Again, two enclaves are shown: enclave 202, comprising workstation 204; and enclave 220, comprising workstation 218. Enclave 202 is fronted by HAIPE 206, and enclave 220 is fronted by HAIPE 216. Communications between HAIPE 206 and HAIPE 216 occur over black network 208, in accordance with an embodiment of the present invention.

In accordance with an additional embodiment of the present invention, enclave 202 is a HAIPE environment that does not have its own local discovery service. Instead, workstation 204 and HAIPE 206 are operable to use a peer discovery service located in router 210. In accordance with an additional embodiment of the present invention, the peer discovery service of router 210 is secured by another HAIPE. Enclave 220, on the other hand, is a HAIPE environment having a dedicated local discovery service, shown as router 214. Protected routers 212a and 212b are traditional routers implementing BGP, in accordance with an embodiment of the present invention. One skilled in the relevant arts will appreciate that routers 212a and 212b may be Commercial Off-the-Shelf ("COTS") routers capable of implementing BGP. Additionally, routers 210 and 214 are also COTS routers, with some modification to allow for HAIPE PT-to-CT mapping and peer discovery, in accordance with an embodiment of the present invention.

Figure 3:
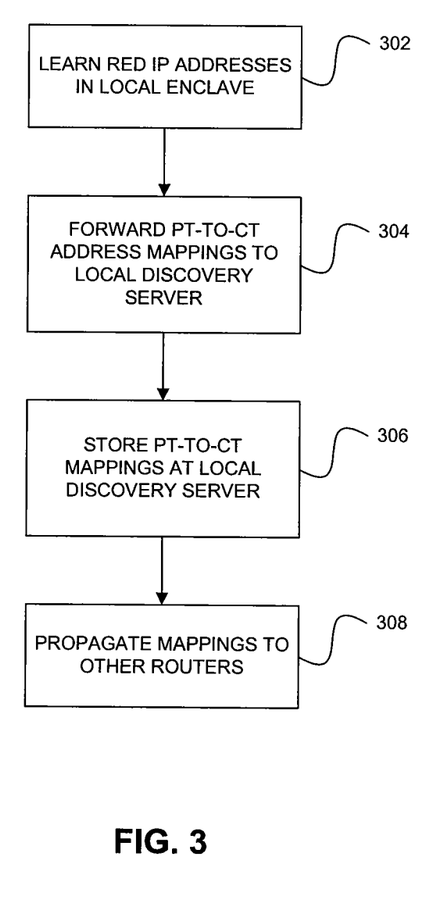
FIG. 3 is a flowchart illustrating steps by which a secure communications network implements enhanced discovery, in accordance with an embodiment of the present invention.

Communications between workstation 204 and workstation 218 using a secure channel established by HAIPE 206 and 216 normally proceeds as described previously in Section I. Turning to FIG. 3, with continued reference to FIG. 2, the steps of PT-to-CT mapping and peer discovery are detailed according to an embodiment of the present invention. Normally, HAIPE 206 would not have any knowledge of how to enable workstation 204 to establish secured communications with workstation 218, as HAIPE 206 and the local discovery server (in this case, router 210) would not have a CT address for workstation 218 (in this case, the CT address of HAIPE 216) and would only have the PT address of workstation 218. Accordingly, FIG. 3 details steps by which PT-to-CT mappings are created and used in peer discovery in accordance with an embodiment of the present invention.

FIG. 3 is a flowchart 300 illustrating the steps of generating HAIPE PT-to-CT mappings for a discovery server, such as router 210, in accordance with an embodiment of the present invention. At step 302, a HAIPE device, such as HAIPE 206, learns the "red IP addresses" (or PT addresses) of networked devices in the local enclave, such as the PT address of workstation 204 by participating in the local routing. By inspecting its own routing table, HAIPE 206 knows the PT addresses of network devices that HAIPE 206 is protecting At step 304, the HAIPE device forwards a mapping between the PT address of the registered device and the CT address of the HAIPE device to the local discovery service. In the case of example network 200, HAIPE device 206 would know the PT address of registered workstation 204 as well as the HAIPE device's 206 own CT address, and would create a mapping between the two to send to the protected discovery service located at router 210. Router 210, upon receiving the PT-to-CT mappings, would store the mappings at step 306.

At step 308, the PT-to-CT mappings are propagated to other routers. In accordance with an embodiment of the present invention, this propagation is consistent with the BGP specification, enabling COTS routers, such as routers 212a and 212b, to participate in the receipt and propagation of the PT-to-CT mappings. In accordance with an additional embodiment of the present invention, the PT-to-CT mappings are received and cached by a second local discovery server, such as router 214, for use by a second enclave in contacting networked devices for which PT-to-CT mappings are available.

In accordance with an embodiment of the present invention, to implement enhanced routing based discovery, the capabilities to perform the steps of flowchart 300 are added to routing servers at the lowest level of a routing hierarchy, such as routers 210 and 214 in FIG. 2. This is accomplished, in accordance with an embodiment of the present invention, by enabling HAIPE devices, such as HAIPE 206, to inspect its own routing tables to find PT addresses for HAIPE clients, such as workstation 204. PT-to-CT mapping information is generated and modified to conform to BGP standards for external routes in order to propagate the mappings.

III. Establishing Communications

Additionally, in accordance with an embodiment of the present invention, a mechanism is developed to allow for the discovery service, such as router 210, to receive a HAIPE client's "query" messages seeking to obtain the CT address of a HAIPE, such as HAIPE 216 fronting a destination address, such as that of workstation 218, extract this address from the BGP routing information table, and send the CT address to the client's HAIPE, such as HAIPE 206.

Figure 4:
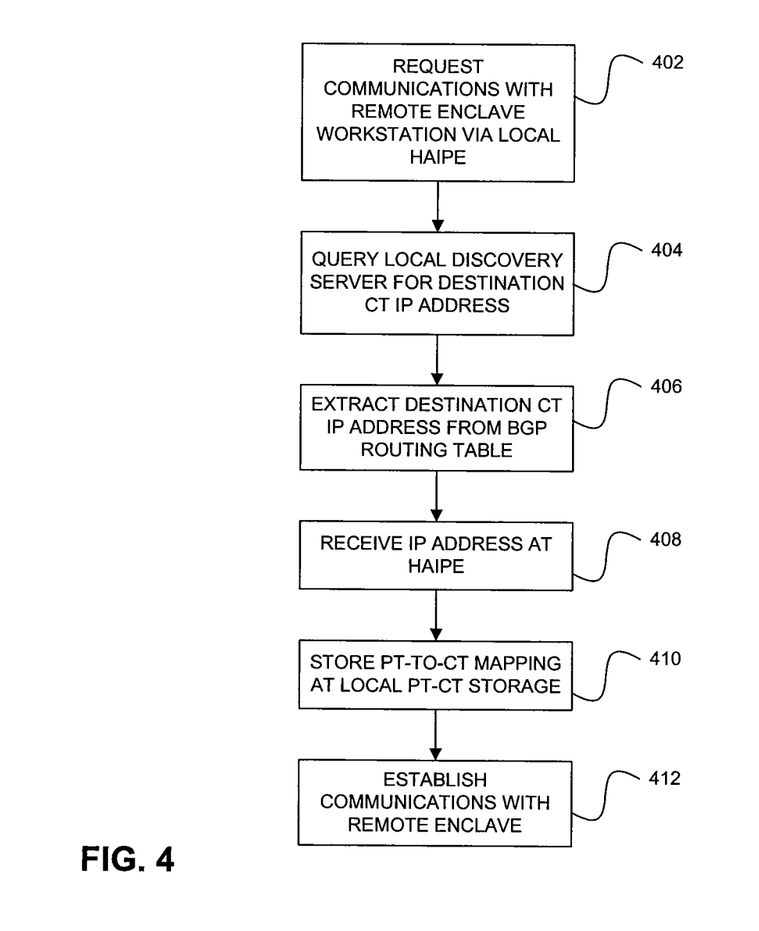
FIG. 4 is a flowchart illustrating steps by which secure communications are established over a secure communications network implementing enhanced discovery, in accordance with an embodiment of the present invention.

With continued reference to the example of FIG. 2, FIG. 4 is a flowchart 400 illustrating the steps by which a network device in a local enclave can establish communications with a network device in a remote enclave using the PT-to-CT mappings in accordance with an embodiment of the present invention.

At step 402, a network device, such as workstation 204, initiates communications with a remote enclave network device, such as workstation 218, by contacting HAIPE 206 to establish the communication, in accordance with an embodiment of the present invention. In accordance with an additional embodiment of the present invention, workstation 204 only knows the PT address of workstation 218, which it provides to HAIPE 206 when initiating communications.

At step 404, HAIPE 206 requests the destination CT address which corresponds to the destination PT address provided by workstation 218 from router 210 (the local discovery service). If the peer discovery steps detailed in Section II have been completed, then router 210 is able to provide a valid corresponding destination CT address at step 406 by extracting the CT address from its BGP routing table. Router 210 then sends this CT address to the HAIPE 206, which receives it at step 408. HAIPE 206 then stores the learned PT-CT mapping at the local PT-CT mapping storage in HAIPE 206 itself at step 410. At this point, HAIPE 206 is then able to establish communications at step 412 with the fronting HAIPE corresponding to the CT address.

IV. Routing and Discovery Hierarchy

Figure 5:
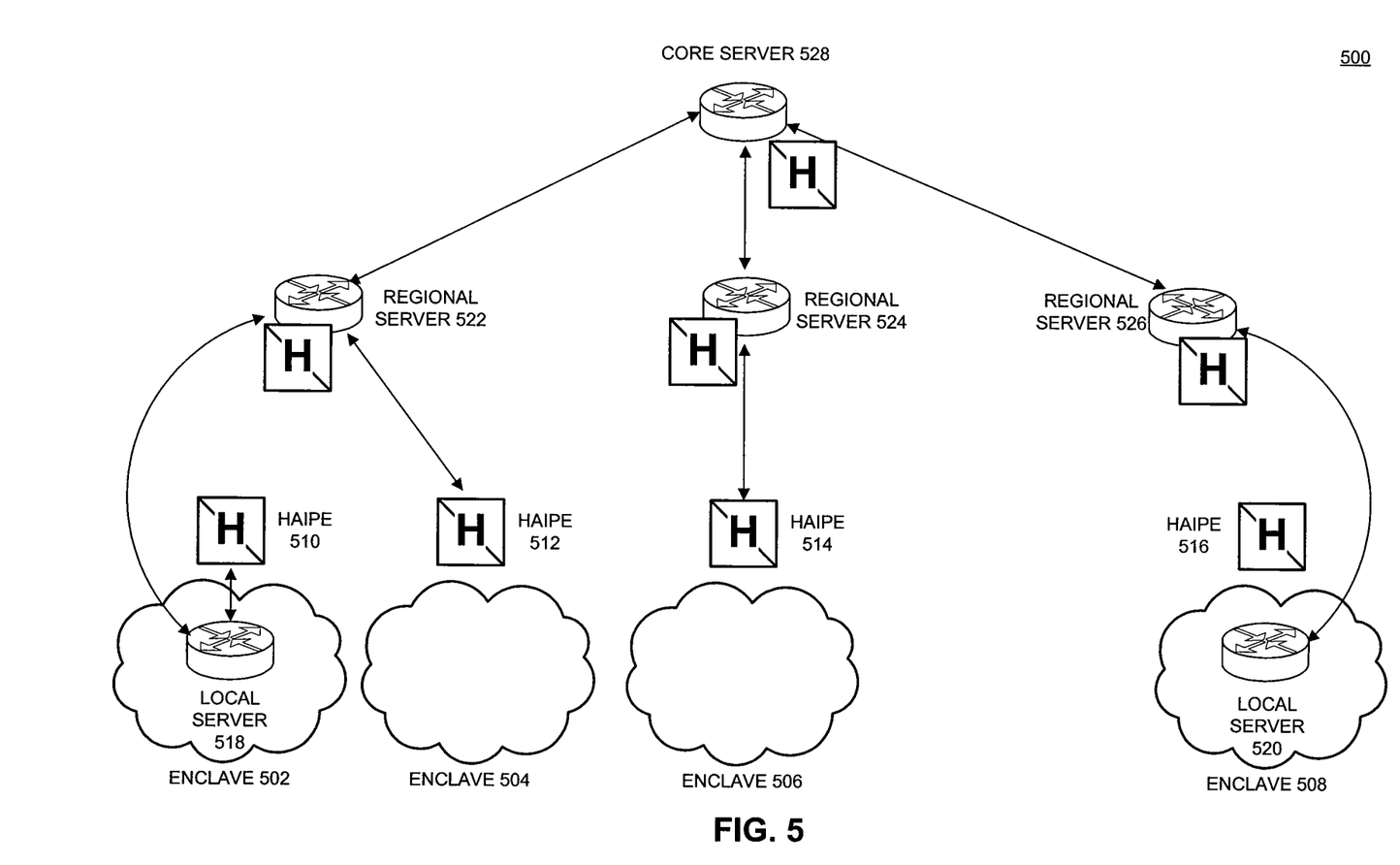
FIG. 5 illustrates a secure communications network implementing enhanced discovery with a discovery server hierarchy, in accordance with an embodiment of the present invention.

FIG. 5 depicts an example secure communications network 500 comprising four enclaves, enclaves 502, 504, 506, and 508, in accordance with an embodiment of the present invention. Each enclave has a fronting HAIPE, HAIPEs 510, 512, 514, and 516, respectively. Furthermore, the enclaves are associated with protected "regional" servers, indicating that the enclaves are geographically separated such that they do not communicate with a common regional server, in accordance with an embodiment of the present invention.

Since discovery services can be located within an enclave or within a black core, it is possible to construct a secure network 500 which utilizes enclaves implementing varying discovery service access means. For example, enclaves 502 and 504 are located within a common region, and have access to protected regional server 522, in accordance with an embodiment of the present invention. However, in this example, enclave 502 is depicted as a "fixed" network with its own dedicated local server 518, whereas enclave 504 does not have a local server. Since the discovery functionality disclosed in Section II is added on top of traditional BGP routing functionality, local server 518 can create CT-to-PT mappings for enclave 502 and readily communicate with regional server 522 using BGP, even while enclave 504 utilizes protected regional server 522 as its "local" server.

Similarly, in this example, enclave 506 is operable to use protected regional server 524 as its "local" discovery server, and enclave 508 is operable to have a local discovery server 520 as well as communications with a regional server 526. Moreover, in accordance with an embodiment of the present invention, each of the local servers is operable to communicate with the protected regional servers using BGP. In accordance with an additional embodiment of the present invention, regional servers are operable to communicate with one or more core servers 528 in order to propagate routing information using BGP.

V. Reply Communications Optimizations

Figure 6:
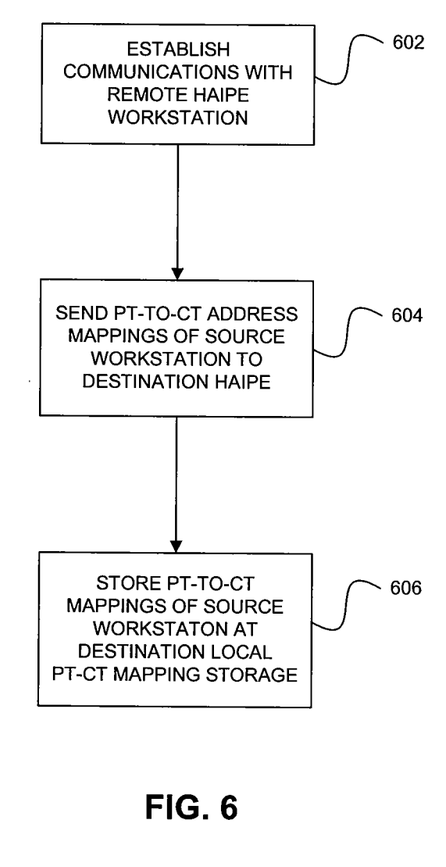
FIG. 6 is a flowchart illustrating steps for optimizing establishment of communications during a reply, in accordance with an embodiment of the present invention.

FIG. 6 is discussed with continued reference to FIG. 2. FIG. 6 is a flowchart 600 illustrating steps by which a network device, such as workstation 218, which has previously received communications from another network device in a different enclave, such as workstation 204, can readily establish a reply communication path without the need to engage in additional peer discovery, in accordance with an embodiment of the present invention.

At step 602, a first network device in a first enclave, such as workstation 204 in enclave 202, establishes communications with a remote workstation in a remote enclave, such as workstation 218 in enclave 220, through the steps detailed in Section III. At step 604, the HAIPE device 206 fronting workstation 204 sends its own PT-to-CT address mappings to the fronting destination HAIPE, such as HAIPE 216. At step 606, HAIPE 216 stores the PT-to-CT mappings in its own local PT-to-CT mapping storage.

By having any HAIPE device that initiates communications send its own PT-to-CT mappings, remote workstations needing to engage in reply communications have the necessary mappings available to them at their own local discovery servers.

Figure 7:
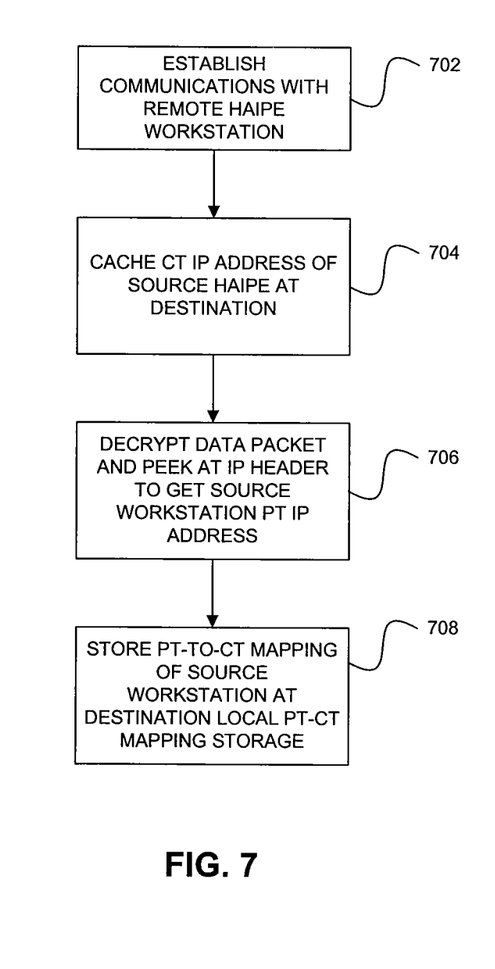
FIG. 7 is a flowchart illustrating additional steps for optimizing establishment of communications during a reply, in accordance with an embodiment of the present invention.

FIG. 7 is a flowchart 700 illustrating additional steps by which a network device can readily establish a reply communication path, in accordance with an embodiment of the present invention. At step 702, as before, a first network device in a first enclave, such as workstation 204 in enclave 202, establishes communications with a remote workstation in a remote enclave, such as workstation 218 in enclave 220, through the steps detailed in Section III. At step 704, the destination HAIPE captures the CT address of the source HAIPE device. One skilled in the relevant arts will appreciate that this can be accomplished in a number of ways, including but not limited to analyzing the source address field of the HAIPE communications.

At step 706, a data packet is selected and deconstructed in order to obtain a packet header, such as an IP packet header, comprising a source address corresponding to the PT address of workstation 204. In accordance with an embodiment of the present invention, the data packet selected is the first data packet in the communications. With both the CT and PT addresses available, the appropriate mapping is made and stored in the destination HAIPE's own local PT-to-CT mapping storage.

VI. Example Computer System Implementation

Figure 8:
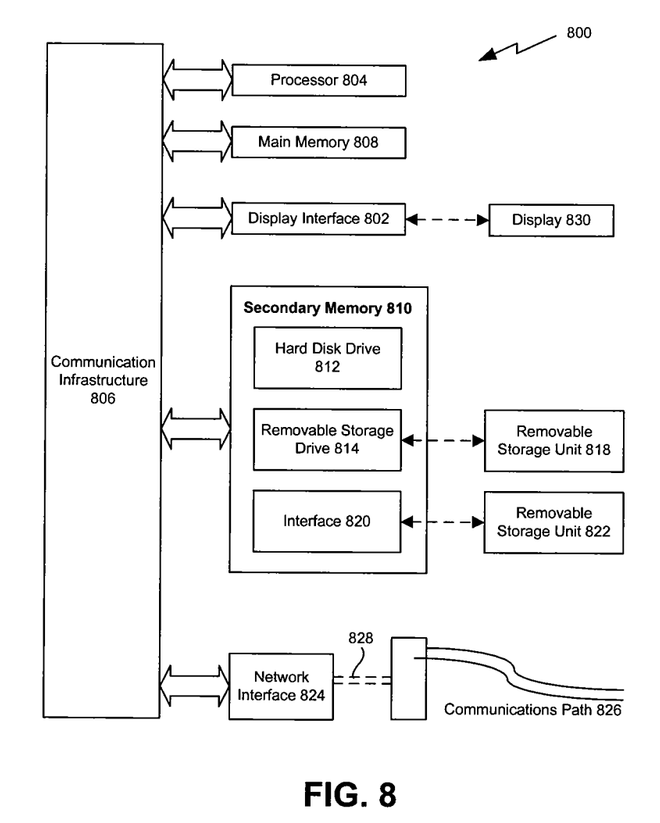
FIG. 8 depicts an example computer system in which embodiments of the present invention may be implemented.

Various aspects of the present invention can be implemented by software, firmware, hardware, or a combination thereof. FIG. 8 illustrates an example computer system 800 in which the present invention, or portions thereof, can be implemented as computer-readable code. For example, the methods illustrated by flowcharts 300 of FIG. 3, 400 of FIG. 4, 600 of FIG. 6, and 700 of FIG. 7 can be implemented in system 800. Various embodiments of the invention are described in terms of this example computer system 800. After reading this description, it will become apparent to a person skilled in the relevant art how to implement the invention using other computer systems and/or computer architectures.

Computer system 800 includes one or more processors, such as processor 804. Processor 804 can be a special purpose or a general purpose processor. Processor 804 is connected to a communication infrastructure 806 (for example, a bus or network).

Computer system 800 also includes a main memory 808, preferably random access memory (RAM), and may also include a secondary memory 810. Secondary memory 810 may include, for example, a hard disk drive 812, a removable storage drive 814, and/or a memory stick. Removable storage drive 814 may comprise a floppy disk drive, a magnetic tape drive, an optical disk drive, a flash memory, or the like. The removable storage drive 814 reads from and/or writes to a removable storage unit 818 in a well known manner. Removable storage unit 818 may comprise a floppy disk, magnetic tape, optical disk, etc. which is read by and written to by removable storage drive 814. As will be appreciated by persons skilled in the relevant art(s), removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 are in the form of signals which may be electronic, electromagnetic, optical, or other signals capable of being received by communications interface 824. These signals are provided to communications interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 818, removable storage unit 822, and a hard disk installed in hard disk drive 812. Signals carried over communications path 826 can also embody the logic described herein. Computer program medium and computer usable medium can also refer to memories, such as main memory 808 and secondary memory 810, which can be memory semiconductors (e.g. DRAMs, etc.). These computer program products are means for providing software to computer system 800.

Computer programs (also called computer control logic) are stored in main memory 808 and/or secondary memory 810. Computer programs may also be received via communications interface 824. Such computer programs, when executed, enable computer system 800 to implement the present invention as discussed herein. In particular, the computer programs, when executed, enable processor 804 to implement the processes of the present invention, such as the steps in the methods illustrated by flowcharts 300 of FIG. 3, 400 of FIG. 4, 600 of FIG. 6, and 700 of FIG. 7 discussed above. Accordingly, such computer programs represent controllers of the computer system 800. Where the invention is implemented using software, the software may be stored in a computer program product and loaded into computer system 800 using removable storage drive 814, interface 820, hard drive 812 or communications interface 824.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMs, ZIP disks, tapes, magnetic storage devices, optical storage devices, MEMS, nanotechnological storage device, etc.), and commu-

XII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method, comprising:
   obtaining, by a HAIPE device fronting a local enclave, an address for a network device in the local enclave;
   determining, by the HAIPE device, an address for the HAIPE device fronting the local enclave;
   creating, by the HAIPE device, a mapping between the address for the network device to the address for the HAIPE device; and
   propagating, by the HAIPE device, the mapping to router secured by a second HAIPE device separate from the router, wherein the router is not in the local enclave.

2. The method of claim 1, wherein obtaining the address for the network device comprises:
   obtaining the address for the network device from a local routing table of the HAIPE device.

3. The method of claim 1, wherein the address for the HAIPE device is a black network address.

4. The method of claim 1, wherein the address for the network device is a red network address.

5. The method of claim 1, further comprising:
   requesting, at the network device, communications with a second network device in a remote enclave, wherein the network device has knowledge of the address of the second network device;
   querying the mapping to determine the address of a HAIPE fronting the remote enclave, wherein the address of the HAIPE fronting the remote enclave is mapped to the address of the second network device; and
   establishing communications between the HAIPE device fronting the local enclave and the HAIPE device fronting the remote enclave.

6. The method of claim 1, further comprising:
   establishing communications with a HAIPE device fronting a remote enclave;
   sending the mapping to the HAIPE fronting the remote enclave; and
   storing the mapping at the remote enclave.

7. The method of claim 1, further comprising:
   establishing communications with a HAIPE device fronting a remote enclave, wherein the communications are requested by the network device;
   determining the address of the HAIPE device fronting the local enclave at the HAIPE device fronting the remote enclave;
   decrypting a data packet to determine a source address corresponding to the network device;
   mapping the address of the HAIPE device fronting the local enclave to the address corresponding to the network device; and
   storing the mapping at the remote enclave.

8. A non-transitory computer usable medium having stored thereon computer-executable instructions that, if executed by a computing device, cause the computing device to perform operations comprising:
   obtaining an address for a network device in a local enclave;
   determining an address for a HAIPE device fronting the local enclave;
   creating a mapping between the address for the network device to the address for the HAIPE device; and
   propagating the mapping to a router secured by a second HAIPE device separate from the router, wherein the router is not in the local enclave.

9. The non-transitory computer usable medium of claim 8, wherein obtaining the address for the network device comprises:
   obtaining the address for the network device from a local routing table of the HAIPE device.

10. The non-transitory computer usable medium of claim 8, wherein the address for the HAIPE device is a black network address.

11. The non-transitory computer usable medium of claim 8, wherein the address for the network device is a red network address.

12. The non-transitory computer usable medium of claim 8, the operations further comprising:
    requesting, at the network device, communications with a second network device in a remote enclave, wherein the network device has knowledge of the address of the second network device;
    querying the mapping to determine the address of a HAIPE fronting the remote enclave, wherein the address of the HAIPE fronting the remote enclave is mapped to the address of the second network device; and
    establishing communications between the HAIPE device fronting the local enclave and the HAIPE device fronting the remote enclave.

13. The non-transitory computer usable medium of claim 8, the operations further comprising:
    establishing communications with a HAIPE device fronting a remote enclave;
    sending the mapping to the HAIPE fronting the remote enclave; and
    storing the mapping at the remote enclave.

14. The non-transitory computer usable medium of claim 8, the operations further comprising:
    establishing communications with a HAIPE device fronting a remote enclave, wherein the communications are requested by the network device;
    determining the address of the HAIPE device fronting the local enclave at the HAIPE device fronting the remote enclave;
    decrypting a data packet to determine a source address corresponding to the network device;
    mapping the address of the HAIPE device fronting the local enclave to the address corresponding to the network device; and
    storing the mapping at the remote enclave.

15. A system comprising:
    a memory configured to store:
    a first module configured to obtain an address for a network device in a local enclave, a second module configured to determine an address for a HAIPE device fronting the local enclave, a third module configured to create a mapping between the address for the network device to the address for the HAIPE device, and a fourth module configured to propagate the mapping to a router secured by a second HAIPE device separate from the router, wherein the router is not in the local enclave; and one or more processors configured to process the modules.

16. The system of claim 15, wherein the first module comprises:

a sixth module configured to obtain the address for the network device from a local routing table of the HAIPE device.

17. The system of claim 15, wherein the address for the HAIPE device is a black network address.

18. The system of claim 15, wherein the address for the network device is a red network address.

19. The system of claim 15, further comprising:

a sixth module configured to request, at the network device, communications with a second network device in a remote enclave, wherein the network device has knowledge of the address of the second network device;

a seventh module configured to query the mapping to determine the address of a HAIPE fronting the remote enclave, wherein the address of the HAIPE fronting the remote enclave is mapped to the address of the second network device; and an eighth module configured to establish communications between the HAIPE device fronting the local enclave and the HAIPE device fronting the remote enclave.

20. The system of claim 15, further comprising:

a sixth module configured to establish communications with a HAIPE device fronting a remote enclave;

a seventh module configured to send the mapping to the HAIPE fronting the remote enclave; and an eighth module configured to store the mapping at the remote enclave.

21. The system of claim 15, further comprising:

a sixth module configured to establish communications with a HAIPE device fronting a remote enclave, wherein the communications are requested by the network device;

a seventh module configured to determine the address of the HAIPE device fronting the local enclave at the HAIPE device fronting the remote enclave;

an eighth module configured to decrypt a data packet to determine a source address corresponding to the network device;

a ninth module configured to map the address of the HAIPE device fronting the local enclave to the address corresponding to the network device; and a tenth module configured to store the mapping at the remote enclave.

* * * * *